April 30, 1929.  J. P. OLSEN  1,710,944
REVERSIBLE END GATE
Filed April 25, 1924
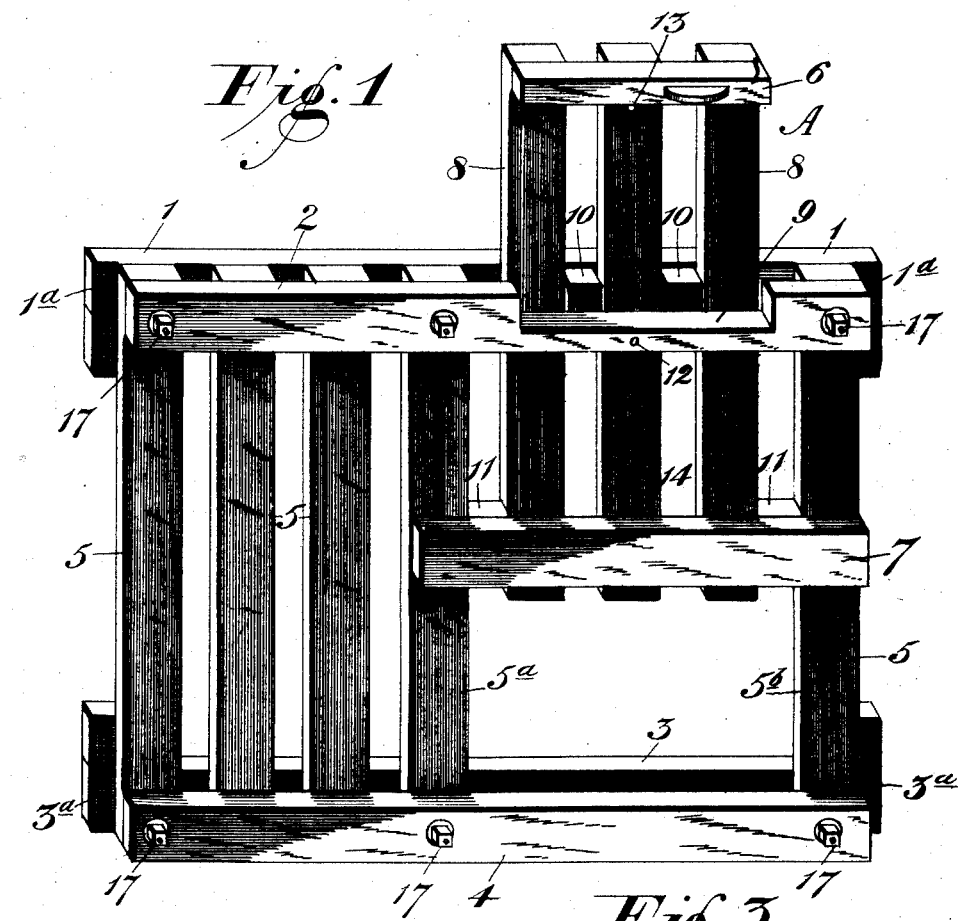
Fig. 1
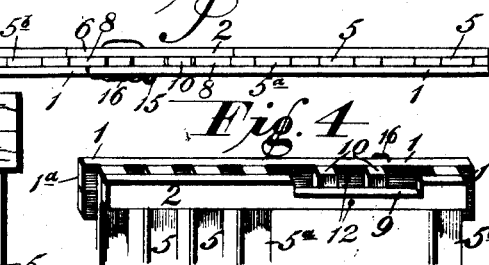
Fig. 3
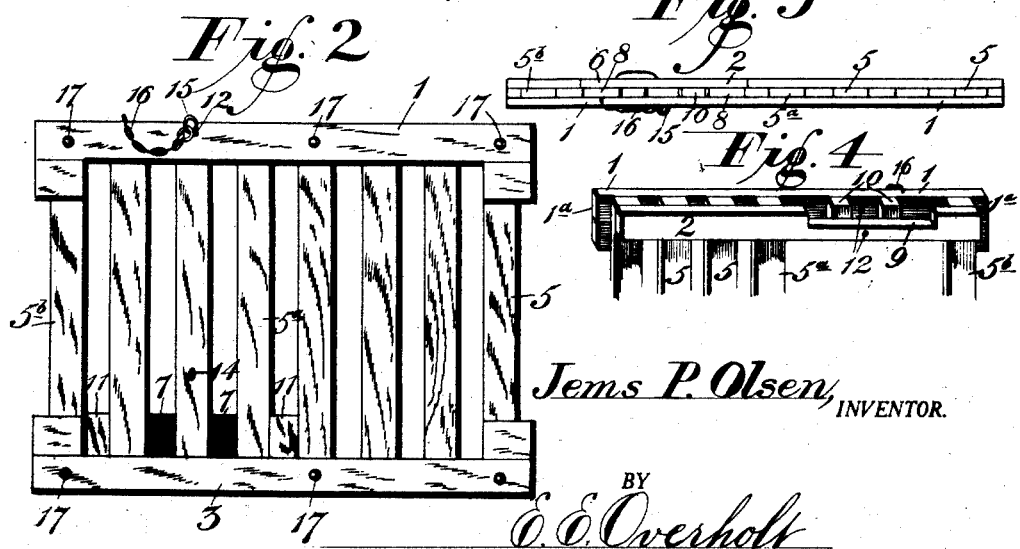
Fig. 2
Fig. 4
Jems P. Olsen, INVENTOR.
BY
C. E. Overholt ATTORNEY.

Patented Apr. 30, 1929.

1,710,944

UNITED STATES PATENT OFFICE.

JEMS P. OLSEN, OF NEWELL, IOWA, ASSIGNOR OF ONE-HALF TO ORVILLE B. ROGERS, OF NEWELL, IOWA.

REVERSIBLE END GATE.

Application filed April 25, 1924. Serial No. 709,004.

My invention relates to a reversible end gate for wagons or trucks used for hauling live stock, especially hogs, sheep, and calves.

My object is to provide an end gate which will permit of the rapid loading and unloading of the animals from the wagons or trucks.

Another object is to provide a device of this character which will be equally adapted for use with the usual chute at stock yards, whether the chute be swung around from the right or from the left.

Still another object is to provide an end gate which will be sure to stay in place in spite of the jar of the vehicle, or anything the animals, especially the hogs, can do to lift it out of place.

A leading feature of the invention consists of an end gate having a small gate at one side instead of at the centre, the end gate being arranged to be easily lifted into or out of place, and to be reversed, to bring the small gate to either side of the wagon or truck, as may be desired.

The advantage of having the small gate thus at one side, as I have designed it, arises from the fact that at present it is practically impossible to unload animals at the ordinary chute as now built and in common use at stock yards; but my device is either right handed or left handed, for while it is shown in Fig. 2 as normally left handed to suit the ordinary left hand chute, yet by simply reversing it, as shown in Fig. 1, it is rendered right handed, for use with a chute which swings around from the right instead of from the left.

The Ford-truck end gate now in use is built of solid wood in three sections, and the sections are so wide that hogs after they are loaded into the truck can get out before the wide end gate in three sections can be put in place; but my end gate is in place before the animals are loaded, and just as soon as they are loaded, the little side gate can be dropped to closed position instantly. Five loads of animals can be unloaded with my end gate to one load from a truck or wagon equipped with the old fashioned solid wood end gate where three rods were required to hold the end gate in place. With my end gate only one rod is necessary to hold the same in place, and that rod does not have to be removed in order to load or unload. That rod is placed at the top in the usual place provided for that purpose.

Another important feature of my invention consists in the construction of the end gate out of vertical bars, which, while affording good ventilation for a crowded load of stock, are so arranged that the animals cannot get their noses or any other part of their bodies under any part of the end gate in a way that would enable them to lift it up.

The invention consists in certain novel features of construction and arrangement of parts, as will be hereinafter described and claimed, reference being had to the accompanying drawings, in which;—Fig. 1 is a perspective view of my improved end gate as it appears from its inner side when used in its normal position, or as it appears from its outer side when used in its reversed position. Fig. 2 is a side elevation on a reduced scale of the outer side of the device as it appears when in closed position. Fig. 3 is a top plan view of Fig. 2; and, Fig. 4 is a broken perspective showing the upper end of my end gate, with the small or auxiliary gate removed.

The end gate is formed of the upper pair of transverse bars 1 and 2, at the outer and inner sides of the gate respectively, and of the corresponding lower transverse bars 3 and 4. Received between these two pairs of transverse bars are the vertical bars 5 suitably spaced from each other and rigidly secured at their upper and lower ends to said upper and lower pairs of transverse bars. The upper and lower parts 1 and 3 have slight projecting portions $1^a$ and $3^a$ at their ends, and these projecting portions drop into the regular end gate grooves at the rear end of the wagon or truck body to removably secure the end gate in operative position. At one side of my end gate is the small auxiliary gate A, which is formed of the upper and lower transverse bars 6 and 7 respectively, and the spaced vertical bars 8 secured at their ends to these transverse bars and movable up and down between the upper pair of transverse bars 1 and 2.

The bar 2 has a cutaway portion at 9 adapted to receive the bar 6 at the top of the auxiliary gate when said gate is moved to its lowermost position. The bar 7 at the lower end of the auxiliary gate is on the inner side of said auxiliary gate and has its end portions projecting to lap the adjacent vertical bars $5^a$ and $5^b$. The vertical bars 8 of the auxiliary gate project somewhat below the lower transverse bar 7, so that when the auxiliary gate is moved down to its lowermost position, the lower projecting ends of the bars 8 will be received between the lower pair of transverse bars 3 and 4. When in this position the lower edge of the bar 7 will rest in flat engagement with the upper edge of the lower transverse bar 4, so as to leave no space between the two for a pig to stick his snout and lift the auxiliary gate.

When the auxiliary gate is in its closed position, the bar 6 being received into the cutaway portion 9 of the bar 2, holds the upper end of said auxiliary gate against edgewise movement, and in order that it may also be held against said movement when said gate is not in its closed position, I provide the blocks 10 which are rigidly secured between the transverse bars 1 and 2, and are adapted to fit easily in the spaces between the transverse bars 8.

Similar blocks 11 are rigidly secured to the transverse bar 7 at the lower end of the auxiliary gate, so that said end is also held against edgewise movement at all times, the bars 5$^a$ and 5$^b$ forming bearings for these blocks 11.

The upper transverse bars 1 and 2 have an opening 12, which extends from the bar 1 through the bar 2 on a downward incline, and the central vertical bar of the auxiliary gate has upper and lower openings 13 and 14 respectively, which come into registration with the opening 12 when the gate is in its lowermost position and its uppermost position. A pin 15 secured to the end gate by a short chain 16 is adapted to pass into the opening 12 and one of the openings 13 or 14 to hold the auxiliary gate in its open or closed position when desired, and the fact that the openings 12 are bored on a downward incline from the bar 1 to the bar 2, keeps the pin from jolting or jostling out.

The transverse and vertical bars of my device are secured to each other in any ordinary or preferred manner, and at the corners and near the middle of the device I also provide the bolts 17 to give a very strong and durable construction.

The blocks 11 are flush with the outer face of the vertical bars, and rest at their lower ends on the bar 3, as illustrated in Fig. 2, so that no place whatever is left for a pig to get his snout under to lift any part of the end gate.

In operation, when my end gate is to be used with a left hand chute at the stock yard, it is placed in the truck or wagon with the auxiliary gate at the left side thereof, as illustrated in Fig. 2; and when it is to be used with a chute that swings around from the right, it is reversed.

From the foregoing, it will be seen that I have provided an end gate of great simplicity, which admits of very rapid loading and unloading of the stock, and one that cannot be either intentionally or accidentally lifted out of position by the stock.

Having now described my invention, what I claim as new and desire to protect by Letters Patent is:—

A wagon box designed to cooperate at its rear end with both right handed and left handed triangular loading chutes at stock yards, said rear end of the box having a reversible end gate movable bodily up and down therein to open and close said end of the wagon box, said end gate having an opening in one side thereof; and a smaller gate for opening and closing said side opening.

In testimony whereof I affix my signature.

JEMS P. OLSEN.